2,831,903

VINYLIDENE CHLORIDE-TRICHLOROBROMO-METHANE REACTION PRODUCTS

Gilbert Gavlin, Lincolnwood, and Richard Maguire, Chicago, Ill., assignors, by mesne assignments, to Ohmite Manufacturing Company, Chicago, Ill., a corporation of Illinois No Drawing. Application November 30, 1956
Serial No. 625,229

3 Claims. (Cl. 260—658)

This invention relates to liquid vinylidene chloride-trichlorobromomethane reaction products useful as insecticides and as intermediates in the preparation of other halogenated aliphatic hydrocarbon derivatives, particularly by substitution of fluorine for chlorine, as disclosed in our copending application Serial No. 314,566, filed August 8, 1952, entitled "Organic Compound and Method of Producing Same."

The invention also relates to methods of preparing the above disclosed vinylidene chloride-trichlorobromomethane reaction products with high yields.

In proceeding according to the present invention, vinylidene chloride is reacted with trichlorobromomethane in the presence of an addition polymerization initiator. The details of this reaction are disclosed as follows.

The polymerization initiators which are suitable for the present invention are any of the polymerization initiators known in the art for polymerizing addition polymerizable mono olefins such as vinylidene chloride and vinylidene fluoride. Particularly useful are the peroxides such as benzoyl peroxide, tertiary butyl peroxide, lauryl peroxide and acetyl peroxide. In general, any agent that decomposes thermally to give free radicals, or causes the generation of free radicals, is useful in initiating polymerization of the mono olefin addition monomers. For example, ultra violet light, lead tetraethyl and azides may also be used. Suitable chemical initiators are characterized by the fact that they produce free radicals by thermal decomposition and must decompose at the temperature of the reaction.

The quantity of initiator utilized will depend upon the particular characteristics of the specific initiator being used, these characteristics being well known in the art and forming no part of the present invention. In the case of benzoyl peroxide, a concentration of 1.0 mole percent of this peroxide based on the amount of vinylidene chloride is used. As little as 0.01 mole percent and up to 5 mole percent or more can be used effectively. Other peroxides are used in similar amounts.

The reaction may be carried out at a temperature of 0° C. or lower. If a chemical initiator is used, the temperature is one at which the initiator decomposes to free radicals. The decomposition temperature of any given polymerization initiator is well known and forms no part of the present invention. In the case of benzoyl peroxide the temperature may be as low as 60° C. and as high as 100° C. Similar temperatures are used for other peroxides. If it is desired to operate at lower temperatures using peroxide or other peroxide initiators, various compounds such as aromatic amines (aniline, toluidine and the like) may be added to the reaction mixture, and then temperatures as low as 0° C. may be used.

Preferably, the reaction is carried out in sealed vessels utilizing the autogenous pressure of the reactants, although superatmospheric pressures generated by other means can also be employed and pressures above or below the autogenous pressure may be used. In general, the pressure to be employed will depend on any solvent or diluent being used but largely upon the specific initiator employed, since generally the temperature will determine the pressure for any given reaction mixture. In the case of benzoyl peroxide, a suitable pressure would be about 50 pounds per square inch, and similar pressures would be used with other peroxides.

The reaction time may range from 24 hours or less to 100 hours or more. In the case of benzoyl peroxide and other peroxide initiators, a reaction time of almost 50 hours is convenient.

A large excess of trichlorobromomethane is used, since the proportions of liquid reaction products obtained to solid reaction products depends upon the ratio of trichlorobromomethane to vinylidene chloride. The mole ratio should be at least about 10:1 and may be 20:1 or higher. The trichlorobromomethane also functions as a solvent and/or diluent. Other solvents and/or diluents may also be used, if desired, such as the above noted aromatic amines, as long as the reaction mass contains the two reactants in the above disclosed mole ratio.

The reaction of the present invention yields, besides the desired liquid end product, small amounts of two solid by-products of higher molecular weight. One of these by-products is insoluble in trichlorobromomethane, and therefore also in the final reaction mass. This by-product (hereinafter referred to as product I) has a molecular weight range of from 1000 to 5000 and a melting point of 140° C. It may be separated from the final reaction mass by simple filtration, which leaves a filtrate containing trichlorobromomethane having dissolved therein the second solid by-product and the desired liquid end product.

The second solid end product (hereinafter referred to as product II) has a molecular weight range of from 100 to 1100 and a melting point of from 30° to 40° C. It is soluble in trichlorobromomethane but insoluble in petroleum ether, and in trichlorotrifluoroethane and other liquid hydrocarbon and/or halogenated hydrocarbons of like polarity and boiling point or boiling range. Product II may be separated from the final reaction mass (after product I has been separated therefrom) by distilling off, from the final reaction mass, the excess and therefore unreacted trichlorobromomethane, which leaves a waxy substance containing product II and the desired liquid end product (hereinafter referred to as product III); digesting the waxy residue with petroleum ether or trichlorotrifluoroethane or some other liquid hydrocarbon or halogenated hydrocarbon of like polarity and boiling point or boiling range, which will dissolve product III but not product II; and filtering off the undissolved product II. This leaves a solution of product III in the petroleum ether or trichlorotrifluoromethane or like solvent. Product III may be recovered, free from products I and II, by distilling off this solvent.

It should be understood that for many purposes it may not be necessary to isolate product III (the desired liquid end product) from product I or from product II or from both products I and II. The latter two products do not necessarily interfere with the use of product III, say, for some insecticidal purposes. Hence, if desired, the final reaction mass may be subjected to distillation, with or without prior removal of product I by filtration, to remove the excess, unreacted trichlorobromomethane, which would leave a more or less waxy residue containing products II and III and also product I if the latter has not been filtered off prior to the distillation.

Three examples are given hereinbelow of reactions between vinylidene chloride and trichlorobromomethane in the presence of an addition polymerization initiator. Examples I and II show reactions according to the present invention. Example III is carried out according to the present invention except for the use of a mole ratio of trichlorobromomethane to vinylidence chloride of 5:1, for the purpose of illustrating the critical importance of the mole ratio between the two reactants in the production, with good yield, of the desired liquid end product.

*Example I*

A commercial sample of vinylidene chloride containing a polymerization inhibitor was washed with a 5% aqueous solution of sodium hydroxide to remove the inhibitor. The product from the extraction step was washed with water to remove any excess residual sodium hydroxide and thereafter dried over "Drierite" to remove the water. The resultant product was an actively polymerizable vinylidene chloride.

97.0 grams or 1 mole of the active polymerizable vinylidene chloride was mixed with 1980 grams or 10 moles of trichlorobromomethane and 2.42 grams or 0.01 mole of benzoyl peroxide. The mixture was then transferred to Pyrex pressure bottles and neoprene stoppers were wired on. The loaded bottles were placed in an oil bath maintained at a temperature of 70.5° C. ±0.5° C. After 50 hours the bottles were removed from the bath and the product was cooled to room temperature. The cooled product was then filtered through a Buechner funnel to separate that portion of the product which was insoluble in the trichlorobromomethane solution. This portion of the product is hereinafter designated fraction I. The trichlorobromomethane was next removed from the filtrate by distillation at reduced pressures using an oil bath for heating. The last portion of solvent was removed at a pressure of 20 mm. Hg, absolute, at a maximum bath temperature of 70° C.

The product from the distillation step was a waxy residue. This residue was further separated into a liquid and a solid fraction by agitation with low boiling petroleum ether followed by filtration. The solid fraction removed by filtration will hereinafter be referred to as fraction II. The solvent was removed from the filtrate by distillation and a liquid polymer fraction was recovered. This liquid fraction is hereinafter referred to as fraction III.

This reaction yielded 34.0 grams of fraction I, 11.0 grams of fraction II, and 90.0 grams of fraction III. The molecular weights of the various fractions were determined by the boiling point or ebullioscopic method employing benzene as the solvent. The following values were obtained for the molecular weights: fraction I, 5,000–1,000; fraction II, 1,100–100; and fraction III, 500–50.

Fraction III was a liquid at room temperature, whereas fraction II was a solid melting at 30° to 40° C. and fraction I was a solid melting at about 140° C.

Fraction III constituted 65% of the total product.

*Example II*

The procedure in Example I was carried out again, the reactants, polymerization temperature and monomer and peroxide quantities being the same, except that the mole ratio of trichlorobromomethane to monomer used was 20/1 instead of 10/1. This reaction yielded 10 grams of fraction I, 10 grams of fraction II, and 117 grams of fraction III. Fraction III, the desired liquid product, constituted 85% of the total product. The amount of higher molecular weight products was correspondingly decreased.

*Example III*

The procedure followed in Example I was again repeated, all reactants, polymerization temperature, and monomer and peroxide quantities being the same, except that the mole ratio of trichlorobromomethane to monomer used, was 5/1 instead of 10/1. In this reaction the following amounts of products were obtained: 54 grams of fraction I, 30 grams of fraction II and fraction III combined. Thus less than 36% of the total product was contained in the liquid fraction III.

It should be understood that fraction III referred to in the above examples is the desired liquid end product (herein also referred to as product III). This fraction III, or product III, is, as disclosed above, a liquid being a molecular weight range of from 50 to 500.

It is believed that products I, II and III all have the general structural formula $$CCl_3[CH_2-CCl_2]_NBr$$

It is further believed that product III is primarily a mixture of two compounds wherein the value of N is 3 and 4. In products II and III, the value of N exceeds 4.

As disclosed hereinabove, methods are set forth in our co-pending application Serial No. 314,566, filed October 13, 1952, entitled, "Organic Compound and Method of Producing Same," for producing, from product III, a thermally stable, liquid, fluorine containing composition.

Further, product III possesses insecticidal properties, as illustrated by the following experiment.

Various percentages (by weight) of product III were incorporated in flour. Confused flour beetle (*Tribolium confusum*, Duv.) adults were exposed to the treated flour. Specifically, the test material (product III) was dissolved in carbon tetrachloride and the resulting solution was mixed with flour in such quantity that the flour contained 10% (by weight) of product III. After the carbon tetrachloride had evaporated, portions of the 10% mixture were diluted with flour to give mixtures containing 5%, 1%, 0.1% and 0.01% of product III. For controls flour was used to which carbon tetrachloride had been added and then evaporated. Duplicate portions of 10 gram portions of flour of each concentration of product III were placed in 2 ounce jars, and twenty adult flour beetles were added to each jar. There was no immediate knockdown (i. e. in the first two hours) at any concentration. The data with respect to knockdown and percent mortality are given in the following table:

| Product III, percent by weight | 24 hours' knockdown, percent | 48 hours' knockdown, percent | one week dead, percent |
| --- | --- | --- | --- |
| 5 (a) | [1] 100 | 100 | 100 |
| (b) | [1] 100 | 100 | 100 |
| 1 (a) | 5 | [1] 15 | 100 |
| (b) | 0 | [1] 0 | 95 |
| 0.1 (a) | 0 | 0 | 0 |
| (b) | 5 | 5 | 10 |
| 0.01 (a) | 0 | 0 | 5 |
| (b) | 0 | 0 | 10 |
| Control (a) | 0 | 0 | 0 |
| (b) | 0 | 0 | 0 |

[1] Removed to untreated flour at this time.

None of the beetles in this test recovered after having been knocked down even when they were removed to untreated flour. The beetles exposed to flour containing 0.01% of product III appeared less active than those in the controls.

This application is a continuation-in-part of our allowed application Serial No. 303,430, filed August 8, 1952, now abandoned, entitled "Vinylidene Chloride-trichlorobromomethane Reaction Products."

Many details may be varied without departing from the principles of this invention and it is therefore not our intention to limit the patent granted on this invention otherwise than necessitated by the scope of the appended claims.

The invention is claimed as follows:

1. A method of producing a liquid organic product soluble in low boiling petroleum ether and having a molecular weight ranging from 50 to 500, said method comprising reacting one mole of vinylidene chloride with at least 10 moles of trichlorobromomethane, said reaction being carried out in the presence of a polymerization initiator, cooling the resultant reaction mass, filtering the cooled reaction mass to separate a material insoluble in said cooled reaction mass, distilling off unreacted trichlorobromomethane from the filtrate, and extracting from the residual material the said liquid product with a solvent selected from the group consisting of petroleum ether and trichlorotrifluoro ethane.

2. A method of producing a liquid organic product soluble in low boiling petroleum ether and having a molecular weight ranging from 50 to 500, said method comprising reacting one mole of vinylidene chloride with at least 10 moles of trichlorobromomethane, said reaction being carried out in the presence of benzoyl peroxide and at a temperature at which benzoyl peroxide decomposes to give free radicals and at the autogenous pressure of the reaction mass, thereafter cooling the resultant reaction mass, filtering the cooled reaction mass to separate a material insoluble in said cooled reaction mass, distilling off unreacted trichlorobromomethane from the filtrate, and extracting from the residual material the said liquid product with a solvent selected from the group consisting of petroleum ether and trichlorotrifluoro ethane.

3. A liquid organic product soluble in carbon tetrachloride, in low boiling petroleum ether and in trichlorotrifluoro ethane, said product having a molecular weight ranging from 50 to 500 and being the product of a reaction of one mole of vinylidene chloride with at least 10 moles of trichlorobromomethane in the presence of a polymerization initiator.

References Cited in the file of this patent

UNITED STATES PATENTS

| | | |
|---|---|---|
| 2,440,800 | Hanford et al. | May 4, 1948 |
| 2,468,208 | Kharasch | Apr. 26, 1949 |

FOREIGN PATENTS

| | | |
|---|---|---|
| 620,855 | Great Britain | Mar. 31, 1949 |
| 649,555 | Great Britain | Jan. 31, 1951 |

OTHER REFERENCES

Kharasch et al.: "Jour. Am. Chem. Soc.," vol. 69, pages 1100–1110 (1947).